(12) United States Patent
Leum

(10) Patent No.: US 8,869,332 B1
(45) Date of Patent: Oct. 28, 2014

(54) MOBILE LOADING DOCK WITH SLOT-ENGAGING MEMBER

(71) Applicant: Grant Leum, Excelsior, MN (US)

(72) Inventor: Grant Leum, Excelsior, MN (US)

(*) Notice: Subject to any disclaimer, the term of this patent is extended or adjusted under 35 U.S.C. 154(b) by 0 days.

(21) Appl. No.: 13/903,200

(22) Filed: May 28, 2013

(51) Int. Cl.
*E01D 15/00* (2006.01)
*B65G 69/30* (2006.01)

(52) U.S. Cl.
CPC ................................. *B65G 69/30* (2013.01)
USPC ........................................................ 14/69.5

(58) Field of Classification Search
CPC ................................................ B65G 69/30
USPC ............................................ 14/69.5; 193/38
See application file for complete search history.

(56) References Cited

U.S. PATENT DOCUMENTS

| | | | |
|---|---|---|---|
| 2,547,956 A * | 4/1951 | McDonald ...................... | 14/69.5 |
| 2,739,325 A * | 3/1956 | Grace, Jr. ....................... | 14/69.5 |
| 3,061,125 A * | 10/1962 | Noland .......................... | 414/607 |
| 4,453,282 A * | 6/1984 | Larsen ............................ | 14/71.1 |
| 4,624,446 A | 11/1986 | Gould | |
| 4,765,792 A | 8/1988 | Cherry et al. | |
| 5,306,112 A * | 4/1994 | Kielinski ....................... | 414/491 |
| 5,311,628 A | 5/1994 | Springer et al. | |
| 5,845,356 A * | 12/1998 | Kielinski ....................... | 14/69.5 |
| 6,745,422 B1 * | 6/2004 | Emerson, Jr. .................. | 14/69.5 |
| 6,898,815 B2 * | 5/2005 | Young et al. .................. | 14/69.5 |
| 6,931,686 B2 | 8/2005 | Hoofard et al. | |
| 7,013,519 B2 | 3/2006 | Gleason | |
| 7,062,813 B2 | 6/2006 | Hoofard et al. | |
| 7,216,392 B2 | 5/2007 | Hoofard et al. | |
| 7,310,843 B1 * | 12/2007 | Mitchell ........................ | 14/69.5 |
| 2009/0300860 A1 * | 12/2009 | Campbell ...................... | 14/72.5 |
| 2013/0198978 A1 * | 8/2013 | Pohlman et al. ............... | 14/69.5 |

* cited by examiner

*Primary Examiner* — Raymond W Addie
(74) *Attorney, Agent, or Firm* — Jansson Munger McKinley & Shape Ltd.

(57) ABSTRACT

A mobile loading dock including a planar ramp member having a lower end terminating in a lower edge and an upper end including an upper edge, the lower edge having a slot substantially parallel to the length of the ramp member for engagement with a slot-engaging member. The slot-engaging member is connectable to a fork truck having a fork-engaging sleeve for positioning of the ramp member.

8 Claims, 10 Drawing Sheets

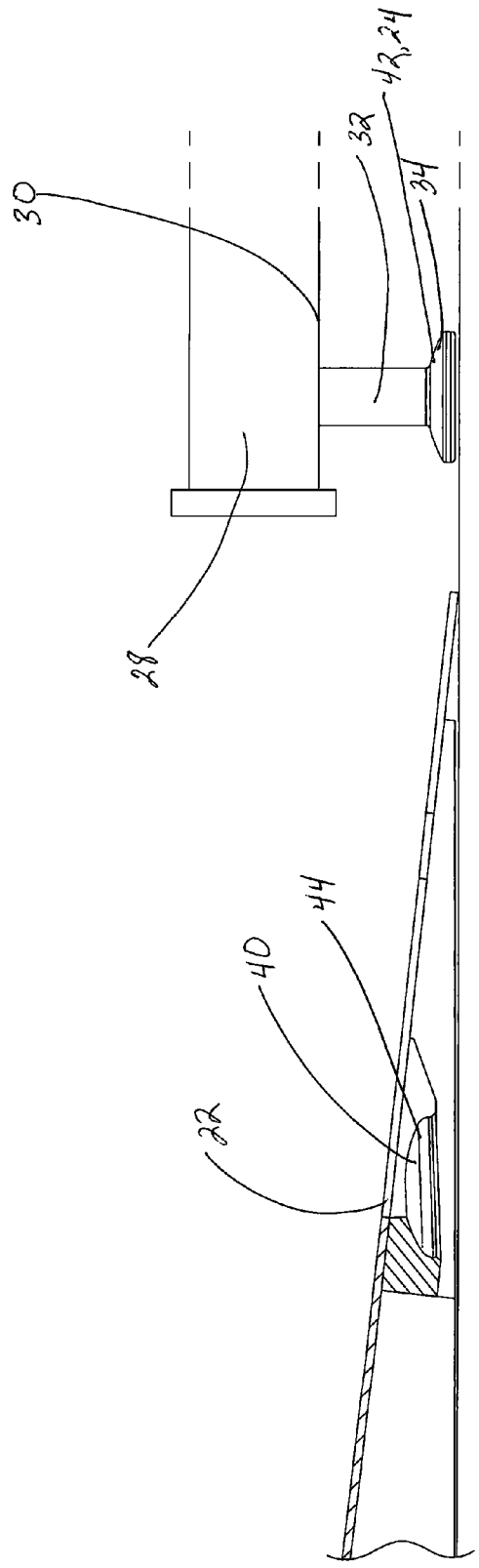
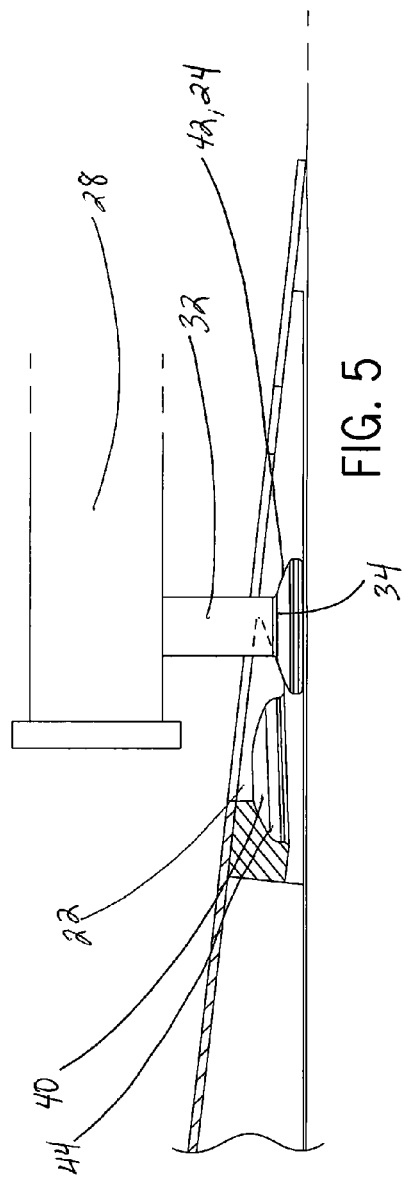
FIG. 4
FIG. 5

MOBILE LOADING DOCK WITH SLOT-ENGAGING MEMBER

FIELD

This device relates to mobile loading docks and more particularly to a loading dock having a slot-engaging member for positioning of the dock.

BACKGROUND

A variety of loading docks have been devised to adjust to the height of different trailers to properly match the deck of the trailer to the height of the dock. By aligning the height of the trailer and the dock the loading and unloading of cargo is facilitated.

There are many such devices in the prior art. One such device is seen in U.S. Pat. No. 4,624,446 to Gould which discloses a reinforced platform pivotally mounted to the ground at one end and includes a support assembly having hydraulic cylinders. In operation the rear wheels of a truck trailer are backed onto the platform and then the non-mounted end of the platform is lifted by the hydraulic cylinders until the deck of the trailer is equal to the height of the dock. A similar device is disclosed in U.S. Pat. No. 4,765,792 to Cherry et al. which also discloses a pivotally-mounted and hydraulically-raised platform.

Loading docks of the prior art typically have certain disadvantages. The majority of moveable loading docks require at least some level of manual manipulation by the user to move the dock into a desired position for loading and unloading of material. Typically, this requires a fork truck operator or other individual to manually connect the ramp portion of the loading dock to a fork truck. This can be done through the use of a loosely connected chain. The individual then must get back in the fork truck, move the ramp to the desired location and then get back out of the fork truck to disconnect the ramp. This is a very time consuming process which may take more than one individual to execute.

It would be desirable to have a mobile loading dock which can be connected and disconnected to a fork truck and moved without the need for the user to leave the fork truck. It would also be desirable to provide a device for connecting a loading dock and the forks on a fork truck which is secure and safe and which also allows for easy maneuvering of the loading dock.

This device overcomes certain problems and shortcomings in the prior art, including those mentioned above and others, and provides advantages for a mobile loading dock not previously provided.

SUMMARY

This device is an improvement in a mobile loading dock apparatus of the type including a lower end terminating in a lower edge and an upper end including an upper edge. The lower edge has a slot substantially parallel to the length of the ramp member for engagement with a slot-engaging member. The slot-engaging member is able to be connected to a fork truck for positioning of the ramp member.

In highly preferred embodiments, a fork-engaging sleeve is used to position the ramp member. Preferably, the fork-engaging sleeve has an underside from which the slot-engaging member protrudes downward. The slot-engaging member includes a downward-protruding rod portion and a flange-end portion connected thereto.

Preferably, the slot includes a first portion and a second portion. The first portion guides the slot-engaging member toward the second portion wherein the slot-engaging member is securable. It is also preferred that the second portion include an arc-shaped member affixed to an underside of the ramp member for receiving the flange-end portion. It is highly preferable that the flange-end portion include a tapered-upward-facing surface for contact and securement with the arc-shaped member when connecting the fork truck to the loading dock.

In preferred embodiments, the arc-shaped member includes a concave-interior surface for securement of the slot-engaging member and for interaction with the tapered-upward-facing surface thereby enabling movement of the ramp member.

In highly preferred embodiments, the fork truck includes at least one fork and the fork-engaging sleeve includes at least one sheathe for receiving the fork. In other highly preferred embodiments, the fork-engaging sleeve includes two sheathes, one for each corresponding fork. Another aspect of the device includes a chain for supplementary securement of the fork-engaging sleeve to the fork truck.

It is highly preferable that the ramp member has opposed sidewalls and the lower edge has edge-end corners. Preferably, the sidewalls extend from the upper edge of the ramp member to termination points between the upper edge and the edge-end corners; the distance between the termination points and the edge-end corners is between 12 inches and 60 inches.

It is preferable that the ramp member include (a) a first upper-end planar portion, the plane of which is parallel to a ground surface on which the ramp member rests; and (b) a second planar portion, the plane of which is downwardly-angled from the upper end to the lower edge. Some embodiments also include a hand-rail secured to the first upper-end planar portion.

It is highly preferred that the mobile loading dock includes a ramp underside with a wheel assembly. In preferred embodiments, the wheel assembly includes a tension spring, a hydraulic member, a leg hingedly attached to the ramp underside and a wheel attached to a leg at an axle and disposed to contact the ground surface beneath the mobile loading dock.

In operation, the tension spring exerts a pulling force on the leg and wheel and the hydraulic member simultaneously exerts a pushing force on the leg and wheel. The combined pulling force and pushing force are directionally disposed to erect the wheel assembly when the lower end of the mobile loading dock is raised from a resting position in contact with the ground surface to a mobile position not in contact with the ground surface.

Preferably, the wheel assembly includes a hydraulic check valve for automatic locking of the wheel assembly into a mobile position when the wheel assembly is erected. The wheel assembly also preferably includes a manually-actuated hydraulic release valve. Actuation of the release valve while in the mobile position causes the pushing force to be reduced and the wheel assembly to return to the resting position.

It is preferred that the wheel assembly also include an elongate weight-bearing support member having a first end attached to the ramp underside and a second end attached to a tension spring and having a foot. The foot contacts the ground surface when the wheel assembly is in the resting position. When in the resting position, the support member bears a portion of the weight of the ramp member.

It is highly preferred that the ramp member include two wheel assemblies, one on each side of the ramp. The wheel assemblies are equally distant from a point on the lower edge and are located on each side of ramp member to provide stability.

BRIEF DESCRIPTION OF THE DRAWINGS

The drawings illustrate a preferred embodiment including the above-noted characteristics and features of the device. The device will be readily understood from the descriptions and drawings. In the drawings:

FIG. 4 is a cross sectional view of the mobile loading dock and fork-engaging sleeve of FIG. 2 taken along line 4-4;

FIG. 5 is a cross-sectional view of the fork-engaging sleeve partially engaged with the loading dock of FIG. 1;

DETAILED DESCRIPTION OF PREFERRED EMBODIMENTS

Figure 1:
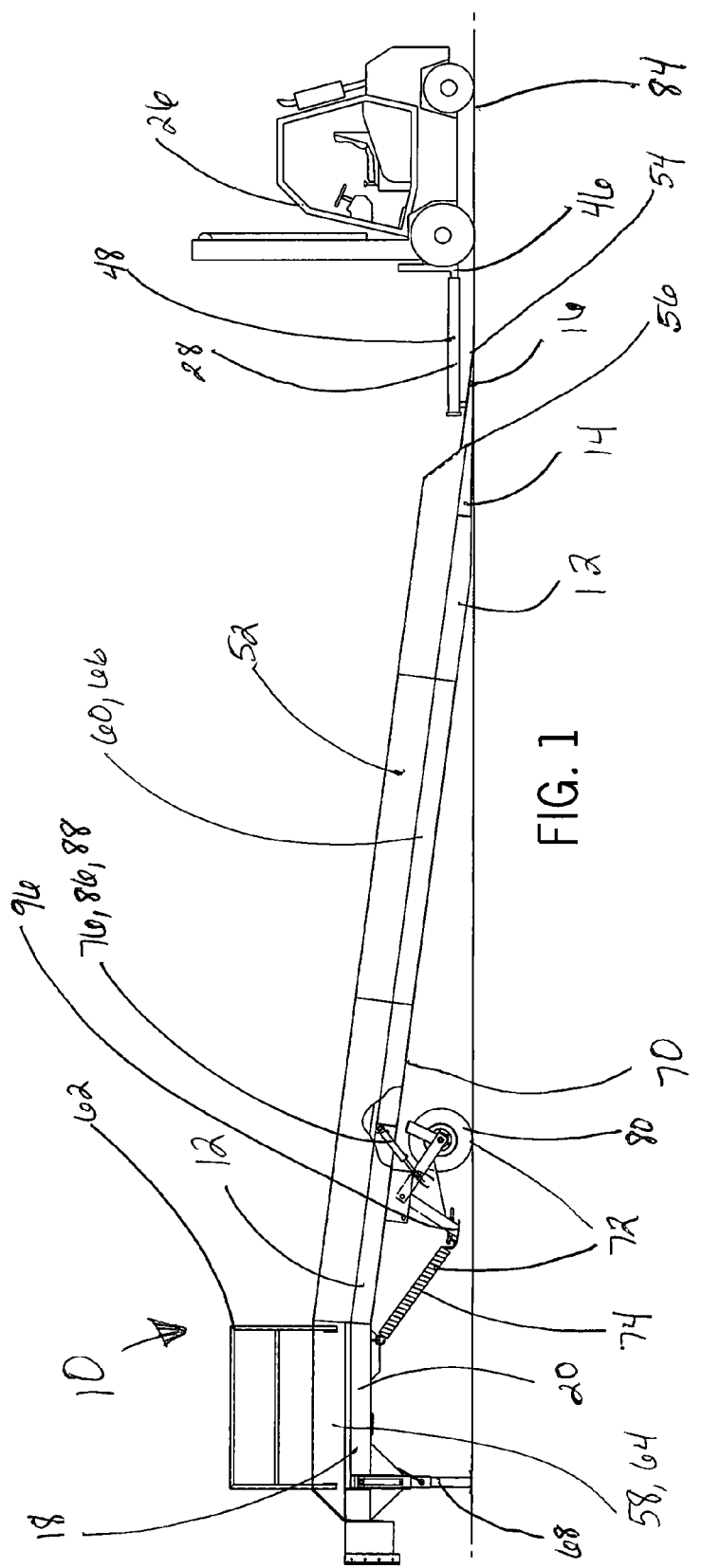
FIG. 1 is a perspective view of the mobile loading dock and fork truck with fork-engaging sleeve.

FIGS. 1-16 illustrate a mobile loading dock 10 with planar ramp member 12. Mobile loading dock 10 includes a lower end 14 terminating in a lower edge 16 and an upper end 18 having an upper edge 20. Lower edge 16 has a slot 22 substantially parallel to the length of the ramp member for engagement with a slot-engaging member 24. Slot-engaging member 24 is able to be connected to a fork truck 26 for positioning of ramp member 12.

FIG. 1 illustrates fork truck 26 connected to ramp member 12 via a fork-engaging sleeve 28. Fork-engaging sleeve 28 is used to position ramp member 12. FIGS. 4-8 illustrate that Fork-engaging sleeve 28 has an underside 30 from which slot-engaging member 24 protrudes downward. Slot-engaging member 24 includes two parts, a downward-protruding rod portion 32 and a flange-end portion 34 as seen in FIGS. 4-9.

Figure 2:
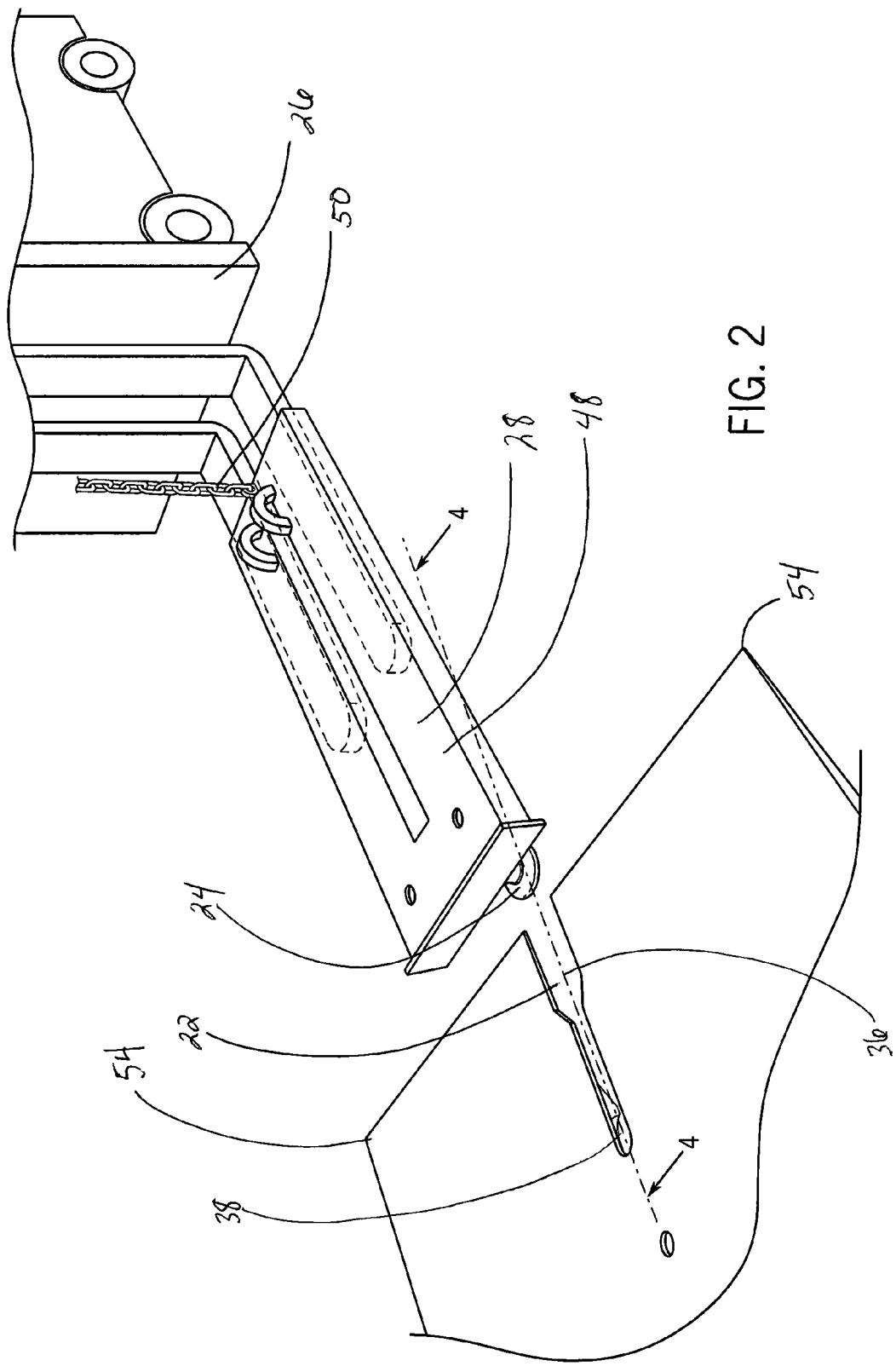
FIG. 2 is a perspective view of the fork-engaging sleeve of FIG. 1.

As illustrated in FIG. 2, slot 22 includes a first portion 36 and a second portion 38. First portion 36 guides slot-engaging member 24 toward the second portion 38. Slot-engaging member 24 is secured in second portion 38. Second portion 38 includes an arc-shaped member 40 affixed to the underside 30 of ramp member 12 for receiving the flange-end portion 34 of slot-engaging member. Flange-end portion 34 include a tapered-upward-facing surface 42. Arc-shaped member 40 includes a concave-interior surface 44 (as seen best in FIG. 10) for securement of slot-engaging member 24 and for interaction with tapered-upward-facing surface 42 thereby enabling movement of ramp member 12.

It is the interaction between flange-end portion 34 (specifically the tapered-upward-facing surface 42) and arc-shaped member 40 that secures ramp member 12 with fork truck 26 and allows fork truck 26 to move and position the ramp member 12.

Figure 3:
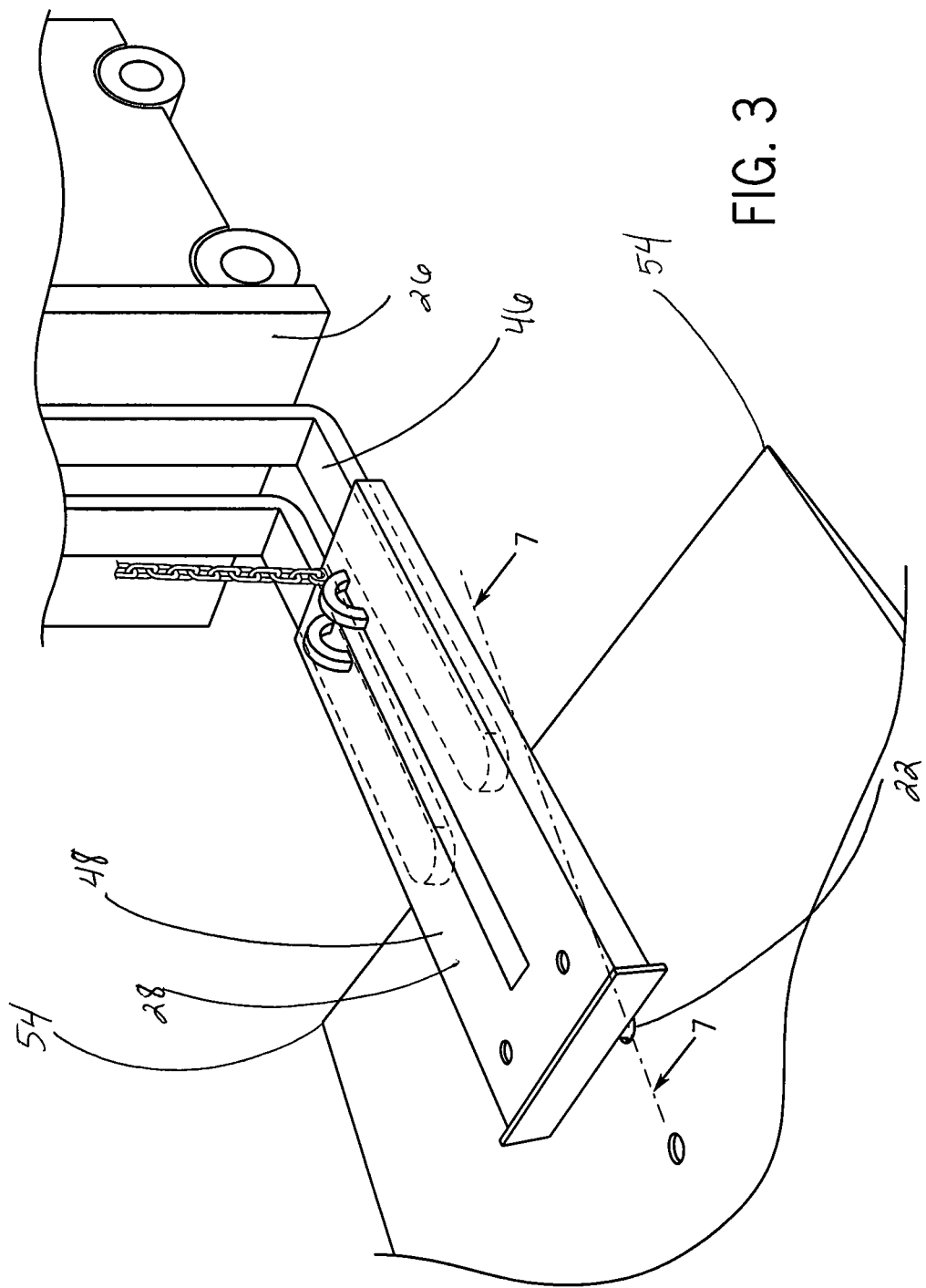
FIG. 3 is a perspective view of the fork-engaging sleeve engaged with the loading dock of FIG. 1.
Figure 6:
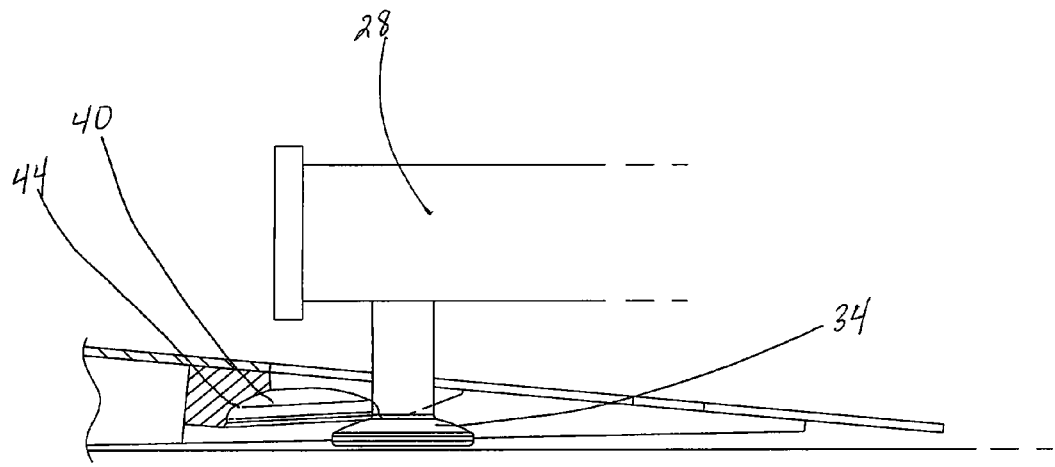
FIG. 6 is a cross-sectional view of the fork-engaging sleeve partially engaged with the loading dock of FIG. 1.
Figure 7:
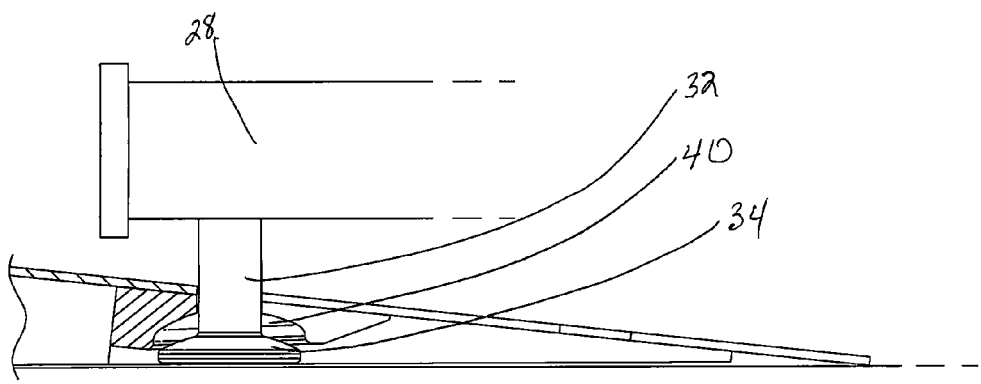
FIG. 7 is a cross sectional view of the mobile loading dock and fork-engaging sleeve of FIG. 3 taken along line 7-7.
Figure 8:
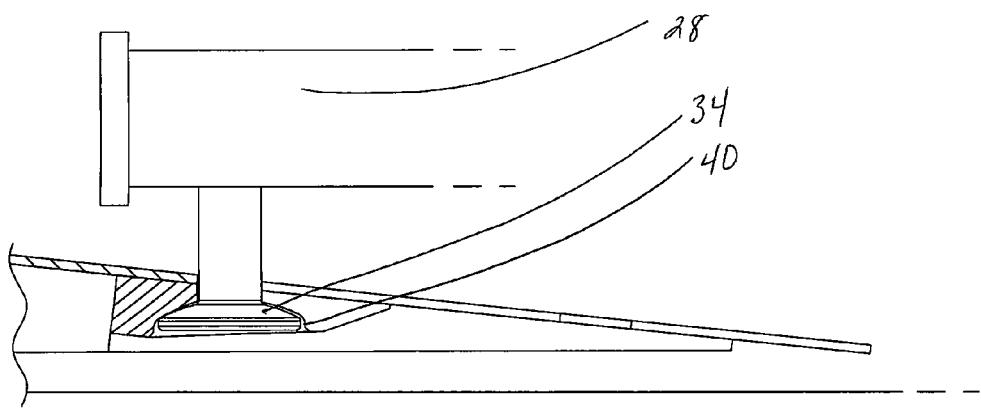
FIG. 8 is a cross-sectional view of the fork-engaging sleeve fully engaged with the loading dock of FIG. 1.
Figure 9:
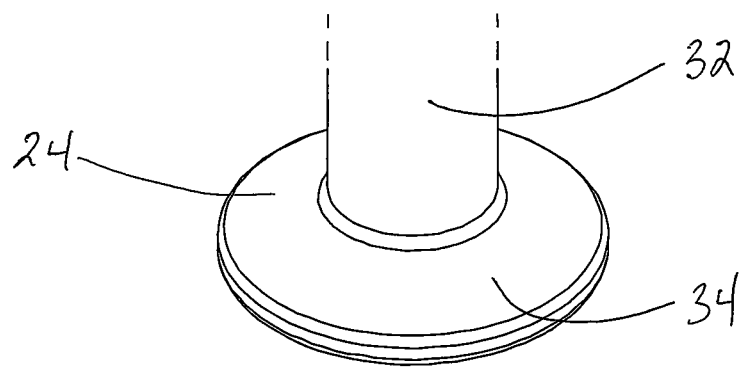
FIG. 9 is a perspective view of the slot-engaging member.
Figure 10:
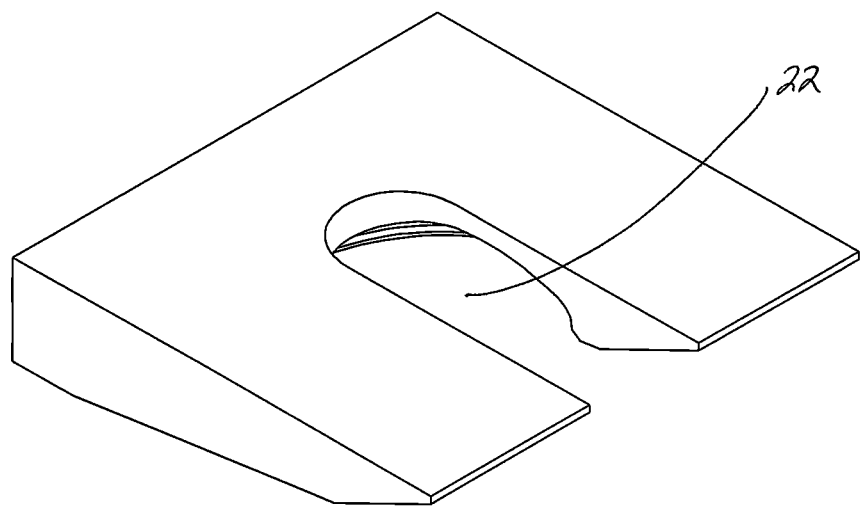
FIG. 10 is a perspective view of the arc-shaped member.
Figure 11:
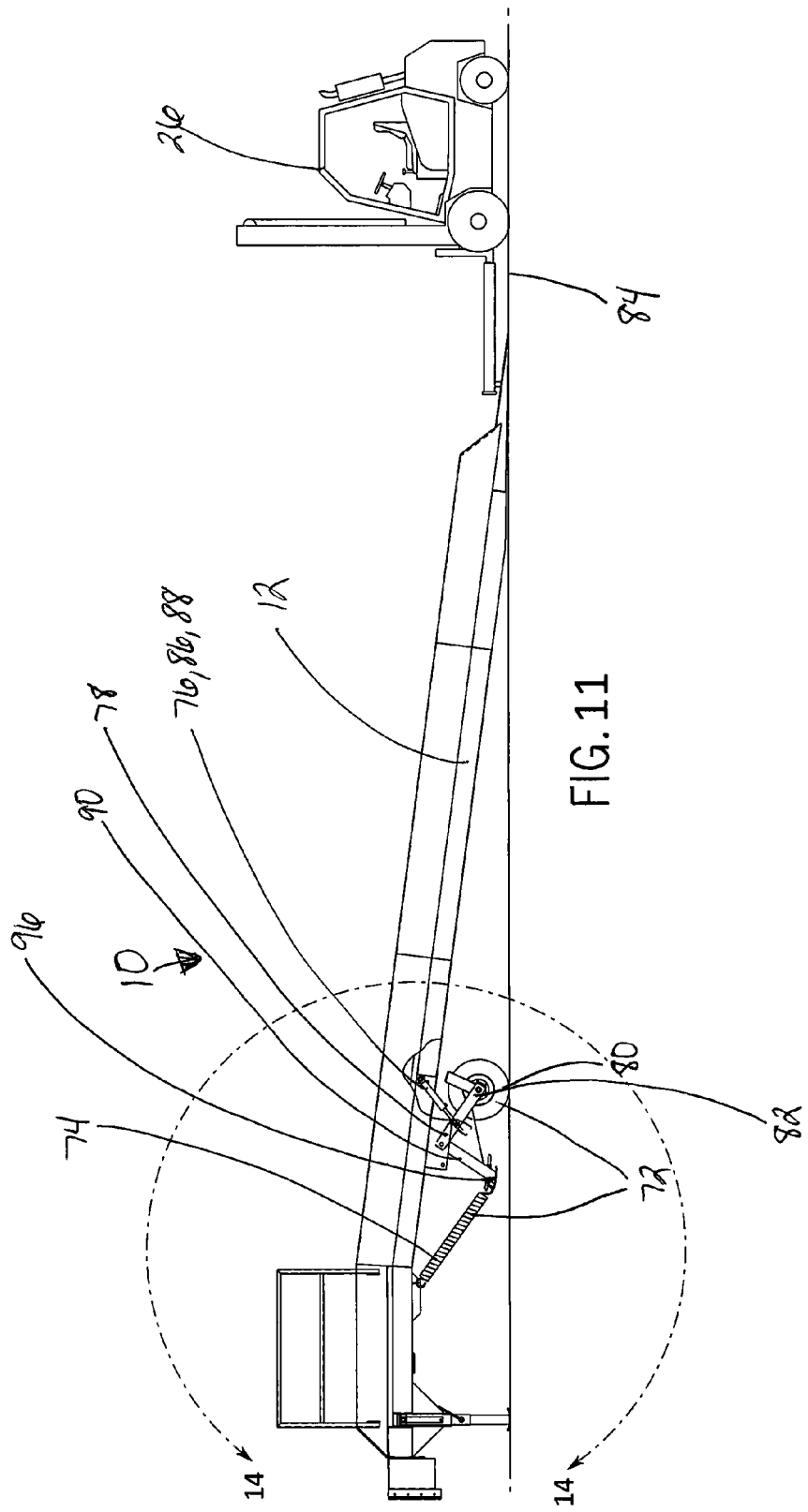
FIG. 11 is a perspective view of the mobile loading dock and fork truck of FIG. 1.

Fork truck 26 includes at least one fork 46 and preferably two forks 46 as seen in FIGS. 2-3. As also illustrated in FIGS. 2-3, fork-engaging sleeve 28 includes at least one sheathe 48 for receiving one fork 46 or two connected sheathes 48 if there are two forks 46. Sheathe 48 slides on to the fork(s) 46 and is held in place through frictional engagement. A chain 50 can be used for supplementary securement of fork-engaging sleeve 28 to fork truck 26 as seen in FIGS. 2-3.

FIGS. 1 and 11-13 illustrate that ramp member 12 has opposed sidewalls 52 that run the majority of the length of ramp member 12. Lower edge 16 of ramp member 12 has edge-end corners 54. (See FIG. 1.) The edge-end corners 54 are located at the end of ramp member 12. Sidewalls 52 on ramp member 12 extend from upper edge 18 to termination points 56. Termination points 56, as seen in FIG. 1, are located between 20 upper edge of ramp member 12 and edge-end corners 54. The distance between termination points 56 and the edge-end corners 54 is between 12 inches and 60 inches.

Ramp member 12 has several different planes as seen in FIGS. 1 and 11-13. These include a first upper-end planar portion 58, the plane 64 of which is parallel to a ground surface on which ramp member 12 rests; and a second planar portion 60, the plane 66 of which is downwardly-angled from upper end 18 to lower edge 16. Some embodiments of ramp member 12 also include a hand-rail 62 secured to first upper-end planar portion 58 as seen in FIG. 1. First upper-end planar portion 58 is the section of ramp member 12 which, when in use, abuts either a loading dock or vehicle for purposes of loading or unloading.

Typically loading docks include a raised dock for the loading and unloading of materials which often come in large quantities and are carried by wooden pallets. Most docks have doorways with overhead doors that provide access to a garage or similar type of building.

FIG. 1 also illustrates that ramp member 12 includes stationary support members 68 which do not articulate but which assist in supporting the weight of the fork truck 26 so that personnel and material handling equipment (such as a fork truck 26), can conveniently move between the loading dock and the truck bed. A manual hand crank is traditionally used to raise or lower the height of the stationary support members 68.

As also seen in FIG. 1, mobile loading dock 10 includes a ramp underside 70 with a wheel assembly 72. FIGS. 11-16 illustrate that wheel assembly 72 has a tension spring 74, a hydraulic member 76, a leg 78 hingedly attached to the ramp underside 70 and a wheel 80 attached to leg 78 at an axle 82 and disposed to contact a ground surface 84 beneath mobile loading dock 10.

Figure 12:
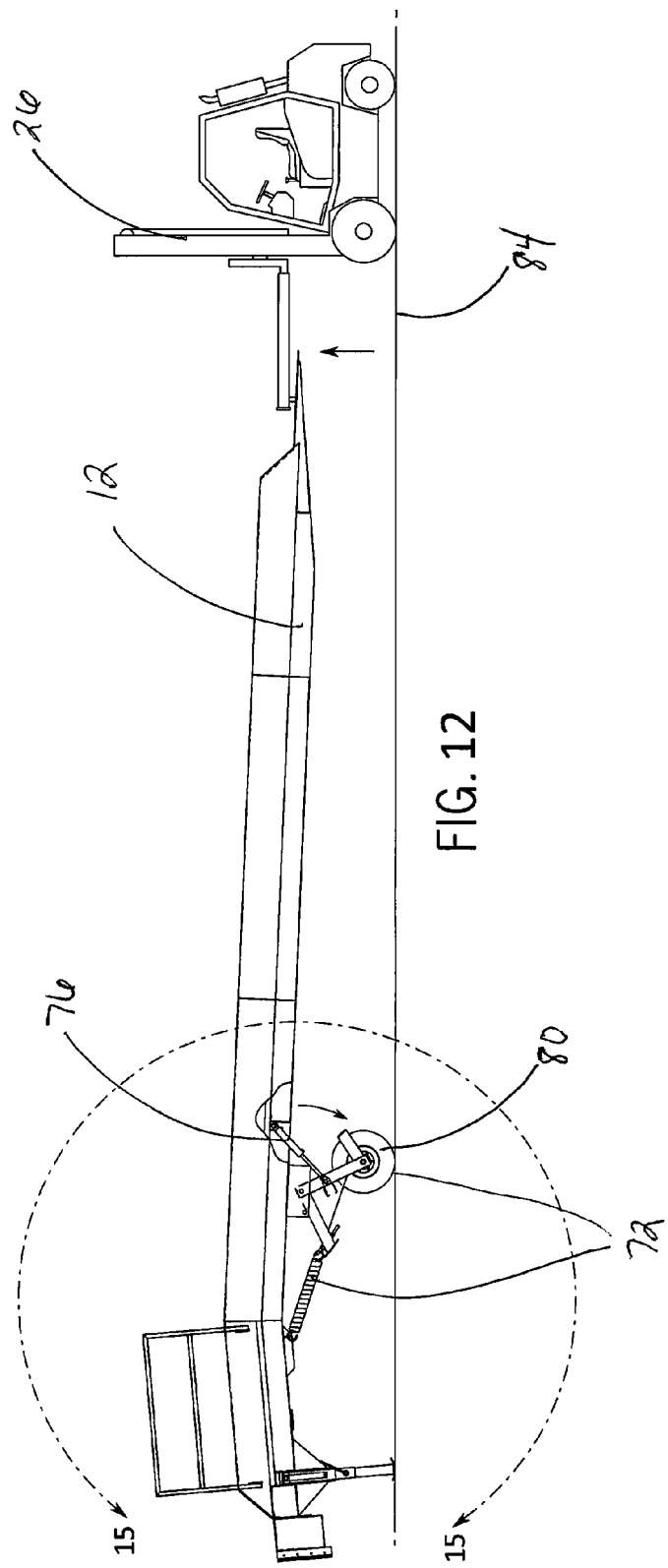
FIG. 12 is a perspective view of the mobile loading dock of FIG. 1 with the ramp member in the raised position.
Figure 13:
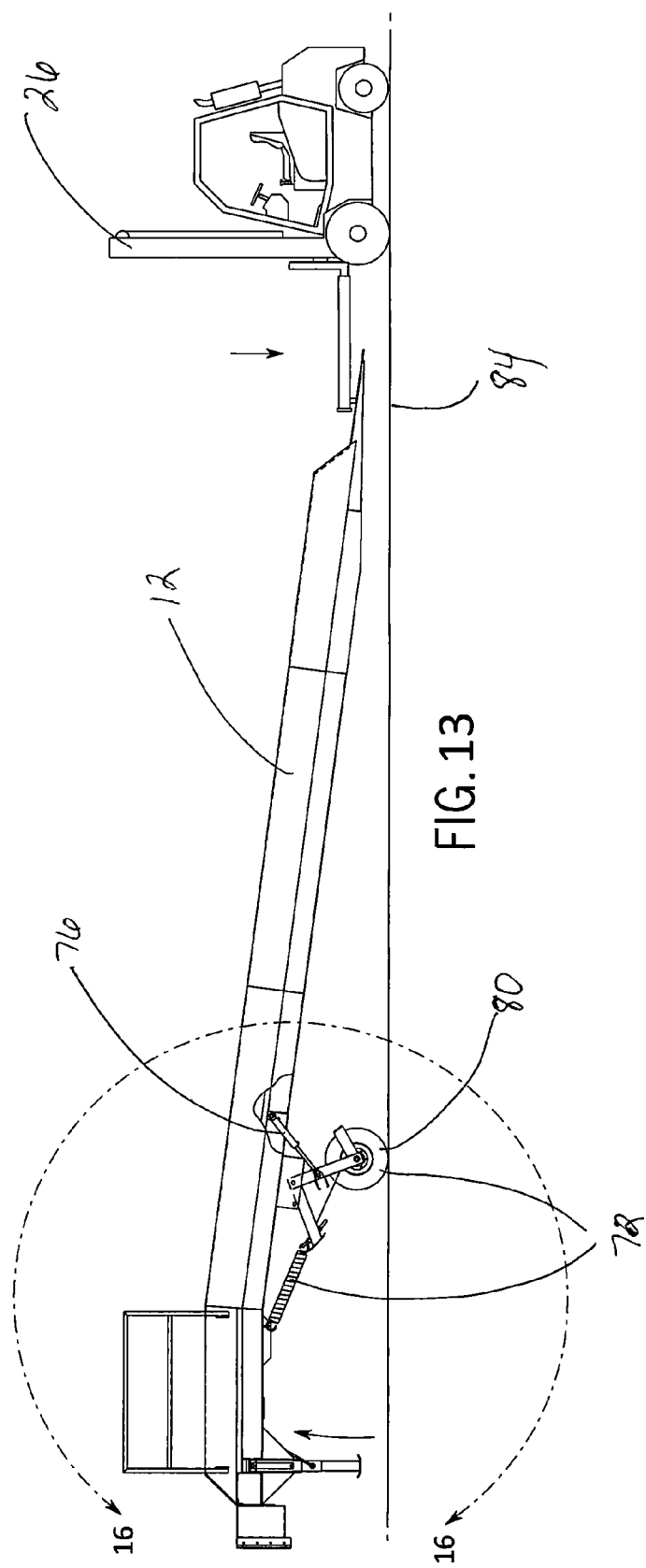
FIG. 13 is a perspective view of the mobile loading dock of FIG. 1 with the ramp member in the lowered position.
Figure 15:
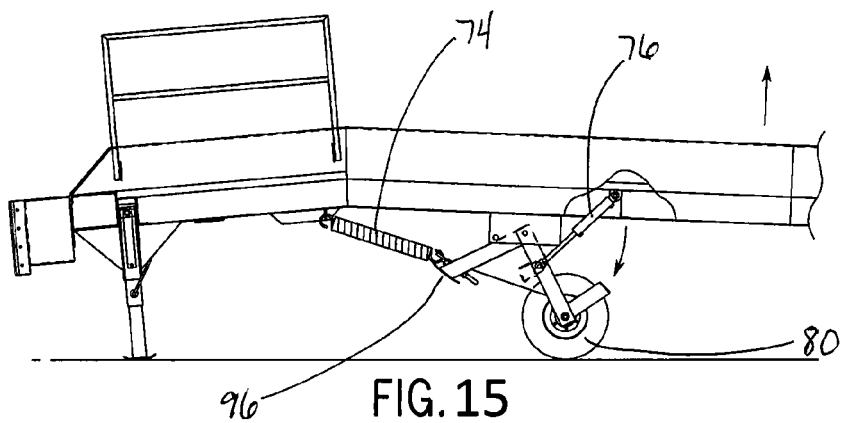
FIG. 15 is a sectional view of the wheel assembly of FIG. 12 taken along line 12-12.

In operation, tension spring 74 exerts a pulling force on leg 78 and wheel 80 and the hydraulic member 76 exerts a pushing force on the leg 78 and wheel 80 as seen by the arrow in FIGS. 12 and 15. The combined pulling force and pushing force being directionally disposed to erect wheel assembly 72 when the lower end 14 of mobile loading dock 10 is raised from a resting position in contact with ground surface 84 (FIGS. 12 and 15) to a mobile position not in contact with ground surface 84.

Wheel assembly 72 includes a hydraulic check valve 86 for automatic locking of wheel assembly 72 into a mobile position when wheel assembly 72 is erected. Wheel assembly 72 also includes a manually-actuated hydraulic release valve 88, actuation of which in the mobile position causes the pushing force to be reduced and wheel assembly 72 to return to the resting position as seen in FIGS. 11, 13-14 and 16.

Figure 14:
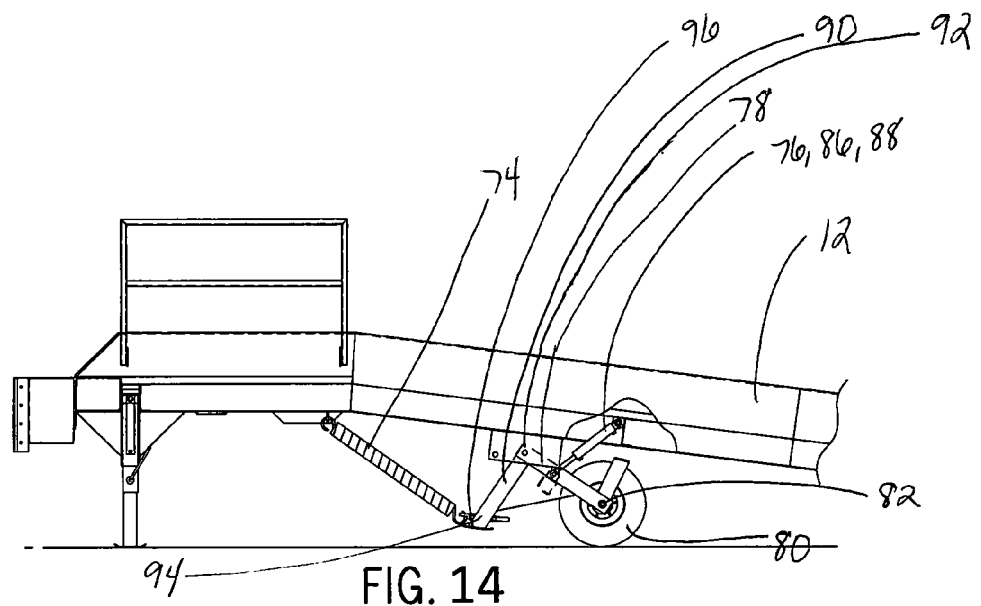
FIG. 14 is a sectional view of the wheel assembly of FIG. 11 taken along line 11-11.
Figure 16:
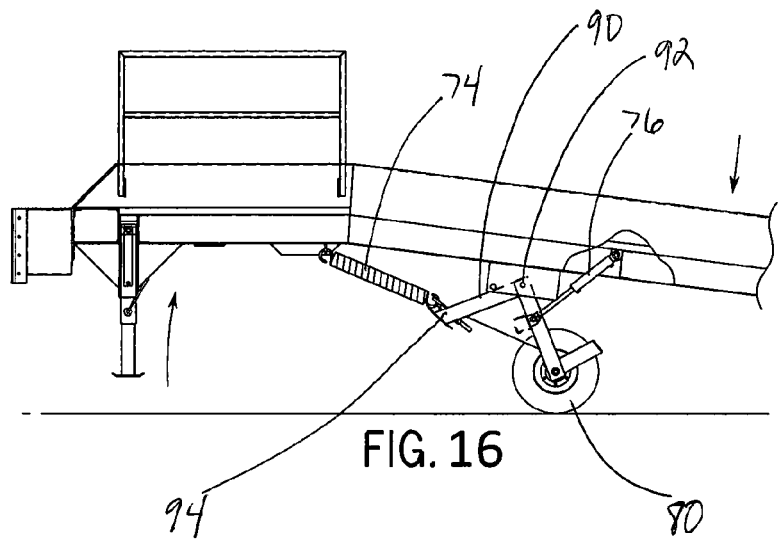
FIG. 16 is a sectional view of the wheel assembly of FIG. 13 taken along line 13-13.

As seen best in FIGS. 14-16, wheel assembly 72 also includes an elongate weight-bearing support member 90 having a first end 92 attached to ramp underside 70 and a second end 94 attached to tension spring 74 and having a foot 96. Foot 96 contacts ground surface 84 when wheel assembly 72 is in the resting position. When in the resting position, support member 90 bears a portion of the weight of ramp member 12.

Ramp member 12 typically includes two wheel assemblies (two not shown) which are equally distant from a point on the lower edge 16 and located on each side of ramp member 12 to provide stability.

In operation, mobile loading dock 10 is moved from a resting to a mobile position by fork truck 26 so that it directly contacts either a dock or a semi-trailer for loading and unloading of material. In order to facilitate movement of mobile loading dock 10, fork truck 26, which already has the fork-engaging sleeve 28 on its forks 46, drives forward towards the lower end 14 of ramp member 12 until slot-engaging member 24 engages slot 22. Fork truck 26 then slowly raises the forks 46 straight up and engages flange-end portion 34 with arc-shaped member 40 thereby securing the connection between the fork truck 26 and the loading dock 10 without the need for manual operation by user. When loading dock 10 is secured to fork truck 26, fork truck 26 can lift up lower end 14 of ramp member 10 and manipulate movement of ramp member 12 in various directions until ramp member 12 is in the desired position.

Fork truck 26 can turn and maneuver loading dock 10 in 90° in either direction given the opposed sidewalls 52 and the corresponding termination points 56. The plurality of possible angles defines a circular arc around lower edge 16 of ramp member 12, the arc subtending an angle greater than 180° and having a center point defined by slot-engaging member 24. Slot-engaging member 24 moving axially within second portion 38 of slot 22 facilitates positional movement of fork truck 26 between any of a plurality of possible angles relative to mobile loading dock 10 in the mobile position and further facilitates fork-truck-driven movement of mobile loading dock 10 in fork-truck-determined directions measurable on an x-axis on the ground surface and a perpendicular y-axis on the ground surface.

As lower end 14 of loading dock 10 is lifted off of the ground 84 into a mobile position, tension spring 74 automatically articulates wheel assembly 72 into the mobile position. Hydraulic member 76 suctions fluid from a tank and a check valve 86 holds hydraulic member 76 in the fully extended position, allowing loading dock 10 to be moved without any human effort on the hydraulic system (no pumping). Fully automatic latching and articulation of loading dock 10 is achieved. Once loading dock 10 is moved into the desired position, loading or unloading of material can begin.

The operator of the fork truck 26 has the ability to pivot the entire loading dock 10 about the wheel assembly 72. When the weight of loading dock 10 is removed as ramp member 12 is lifted, the tension spring 74 will put a force onto the wheel 80, causing the hydraulic member 76 to be mechanically extended as the wheel assembly 72 rotates from the force or tension spring 74. Check valve 86 allows hydraulic fluid to be suctioned from the bottom of a hydraulic tank into cylinders. When fork truck operator lowers the lower end 14, the wheel 80 is moved by the tension spring 74 into position and is held in place by the hydraulic member 76 (specifically a hydraulic cylinder).

A wide variety of materials are available for the various parts discussed and illustrated herein. Although the device has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A mobile loading dock system comprising:
a fork-engaging sleeve having an underside from which a slot-engaging member protrudes downward, the slot-engaging member including a downward-protruding rod portion and a flange-end portion connected thereto, the flange-end portion having a tapered-upward-facing surface; and
a planar ramp member having a lower end terminating in a lower edge and an upper end including an upper edge, the lower edge having a slot substantially parallel to the length of the ramp member for engagement with the slot-engaging member, the slot includes a first portion and a second portion, the first portion for guiding the slot-engaging member toward the second portion wherein the slot-engaging member is securable, the second portion including an arc-shaped member affixed to an underside of the ramp member, the arc-shaped member for receiving the flange-end portion, the arc-shaped member including a concave-interior surface for securement of the slot-engaging member and for interaction with the tapered-upward-facing surface thereby enabling movement of the ramp member;
whereby the slot-engaging member is connectable to a fork truck for positioning of the ramp member.

2. The mobile loading dock of claim 1 wherein the fork truck includes at least one fork and the fork-engaging sleeve includes at least one sheathe for receiving the fork.

3. The mobile loading dock of claim 2 wherein the fork-engaging sleeve includes two sheathes.

4. The mobile loading dock of claim 3 further including a chain for supplementary securement of the fork-engaging sleeve to the fork truck.

5. The mobile loading dock of claim 1 wherein the ramp member has opposed sidewalls and the lower edge has edge-end corners, the sidewalls extending from the upper edge of the ramp member to termination points between the upper edge and the edge-end corners.

6. The mobile loading dock of claim 5 wherein the distance between the termination points and the edge-end corners is between 12 inches and 60 inches.

7. The mobile loading dock of claim 1 wherein the ramp member includes (a) a first upper-end planar portion, the plane of which is parallel to a ground surface on which the ramp member rests; and (b) a second planar portion, the plane of which is downwardly-angled from the upper end to the lower edge.

8. The mobile loading dock of claim 7 further including a hand-rail secured to the first upper-end planar portion.

* * * * *